Patented Mar. 17, 1953

2,631,923

UNITED STATES PATENT OFFICE 2,631,923

PURIFICATION OF MAGNESIA

George M. Armstrong and H Albert Cook, Plymouth, Mass., assignors to The Philip Carey Manufacturing Company, Cincinnati, Ohio, a corporation of Ohio No Drawing. Application March 31, 1949, Serial No. 84,761

8 Claims. (Cl. 23—67)

1

Our invention relates to the purification of magnesia or magnesium salts.

It is the object of our invention to remove impurities such as the salts of iron and manganese from aqueous solutions of mangnesium carbonate, and as auxiliary steps to carry out this purification without substantial added cost either in materials used, in the manufacturing cost or in the labor involved. As articles of commerce, the carbonates and oxides of magnesium contain in varying and relatively minor proportions such impurities as oxides and other compounds of iron, aluminum, manganese, sulphur, arsenic, lead, copper, calcium, silicon, sodium and the like. For many uses, the amounts of these impurities, notably silicon, calcium, iron and manganese compounds are present in excessive amounts.

As examples of our preferred purification method wherein the degree of purity of the magnesia compounds produced is much greater than is necessary to meet ordinary commercial requirements, we will describe our method and the magnesia product (novel as commercially produced in the degree of purity of the magnesia compounds obtained) as steps in the process of recovering magnesia from dolomite rock by the well known Pattinson process, it being understood that the steps in our process may also be carried out in variations, modifications, or improvements in the Pattinson process.

The gist of our invention lies in our discovery that when impurities exist in an aqueous solution of a magnesium salt such as the bicarbonate, such impurities consisting in fractional percentages of salts of iron and manganese (probably also in solution) and other compounds, the percentage of impurities in the solution may be greatly reduced by mixing or slurrying with the solution and subsequently recovering the solution by filtration, sedimentation or settling, a percentage of substantially water-insoluble magnesia compound such as magnesium basic carbonate. As examples the soluble solution disclosed consists of an aqueous solution of magnesium bicarbonate, $Mg(HCO_3)_2$, and the insoluble filtering or precipitation medium consists in magnesium basic carbonate $3MgCO_3.MgO_2H_2.3H_2O$ or normal magnesium carbonate $MgCO_3.3H_2O$. The magnesium compounds found particularly effective are the hydrated carbonates of which the two listed are typical examples. There are other hydrated magnesium carbonates also containing water of crystallization which are effective when properly prepared. Basic magnesium carbonate

2 is a common article of commerce, while the normal magnesium carbonate trihydrate is commonly an intermediate product in the production of the basic carbonate.

While there may be degrees of effectiveness and refinements in processing conditions when our purification steps are carried out under certain controlled conditions in a continuous process, for purposes of illustration we propose to disclose the purification effectiveness broadly of the processing both in a typical batch and also in a typical continuous procedure.

Basic magnesium carbonate, from which other magnesium compounds such as magnesium oxide may be made, is commonly prepared from the mineral dolomite by what is known the Pattinson process. In the practice of this method, dolomite rock, which is essentially an equi-molecular mixture of calcium carbonate and magnesium carbonate of the approximate chemical formula $MgCO_3.CaCO_3$ is first calcined, or "burned," in a kiln to convert the carbonate rock into a mixture of calcium oxide and magnesium oxide, essentially of the chemical formula $MgO.CaO$ and called dolomitic lime. This lime is then hydrated with water to form a dilute slurry of calcium and magnesium hydroxides, both substantially insoluble in water. The solubilities of calcium and magnesium hydroxides in 100 grams of water at 18° C. are respectively about 0.163 gram and 0.0009 gram. This slurry is then treated by passing through it carbon dioxide containing gas until substantially of the calcium hydroxide has been converted to insoluble calcium carbonate and substantially all of the magnesia is in the form of soluble magnesium bicarbonate of the chemical formula: $Mg(HCO_3)_2$. The solid matter is then separated from the mixture of insoluble calcium carbonate and soluble magnesium bicarbonate by filtration or settling or by a combination of these methods of separation. The clarified liquor consists essentially of about a 3 per cent to 3.5 per cent by weight solution of magnesium bicarbonate in water. In practice it is not usually feasible to make solutions containing more of the bicarbonate, as the carbon dioxide pressure and time which are both necessary for the production of higher concentrations are not economically available. The solution of magnesium bicarbonate may then be heated rapidly, or "boiled," at temperatures usually above 200° F., whereupon insoluble basic magnesium carbonate is precipitated, or the solution may be heated at temperatures below about 158° F., at which temperature normal carbonate ($MgCO_3 \cdot 3H_2O$) is formed. Further treatments may be made depending on the particular uses for which the magnesia is desired. In particular, a chemically active form of magnesium oxide, also known commercially as calcined magnesia, is made by the heat decomposition of carbonate of magnesia formed by means of the Pattinson or other process in which magnesium bicarbonate solution is an intermediate product.

In our particular examples we proceed with the purification step when the magnesia is in solution substantially in bicarbonate form $$Mg(HCO_3)_2$$

at a concentration of about 3% or more by weight.

The first example is of a batch process and for the results obtained the processing was continued for a four day period. Two tanks were used, each having a capacity of 1800 gallons. The tanks were filled with 1800 gallons of magnesium bicarbonate solution (liquor), and the contents of the tanks were filtered through cloth covered "plate & frame" presses. Before the first batch of liquor was pumped through the press, 480 pounds of 85% magnesia plastic (90% $3MgCO_3 \cdot MgO_2H_2 \cdot 3H_2O$ plus about 10% of asbestos fiber) were slurried with the 1800 gallons of solution in one of the tanks to give a good precoat on the press. 85% magnesia plastic consists of the ground finely divided trim and scrap from an 85% magnesia heat insulating block and pipe-covering process. Most of the basic carbonate commercially made is used for this purpose. After a good coating had been formed on the press and the liquor was coming through clear, the succeeding batches in the tanks were treated with amounts of the 85% magnesia plastic varying between 0 and 120 pounds. The total amount of plastic used was carefully weighed, the production of magnesium basic carbonate (MBC) per hour was calculated in the solution passing through the press and the hours run per press were noted.

In the second run (continuous process), the bicarbonate liquor was pumped at 60 to 90 gallons per minutes only to one tank and from there continuously to the filter presses. Level in the tank was controlled by the regulation of the feed to the press. When starting a new press, 30 lbs. of magnesia plastic was added every two minutes for one hour. After that 30 lbs. of plastic was added every ten minutes.

The data on purity and operation of the two runs #1 batch and #2, continuous, as compared with the results of standard processing being carried out at the same time without the purification steps, was as follows: (the percentages of $Fe^{+++}$ (iron) and of CaO are based upon the MBC content of the bicarbonate solution; the percent of Mn (manganese) is based upon the magnesium oxide content of the solution).

|  | Run #1 | Run #2 |
|---|---|---|
| MBC produced per hour..............pounds.. | 557 | 557 |
| Lbs. plastic used per hour.................. | 270 | 284 |
| Plastic, percent of MBC..................... | 47.6 | 51.0 |
| Hours per press.............................. | 10.2 | 7.1 |

RUN #1

| Shift No. | Percent U.S.P. | CaO Tech. | Percent U.S.P. | $Fe^{+++}$ Tech. | Percent Mn U.S.P. | Percent Mn Tech. | Car No. | Percent CaO | Percent $Fe^{+++}$ |
|---|---|---|---|---|---|---|---|---|---|
| 1.......... |  | .07 | .009 | .021 |  | .0020 | 169 | .11 | .015 |
| 2.......... | .09 | .25 | .009 | .023 | .0007 |  | 231 | .11 | .012 |
| 3.......... | .17 | .39 | .009 | .027 | .0007 |  | 162 | .11 | .012 |
| 1.......... | .39 | .52 | .017 | .030 | .0009 | .0028 | 157 | .15 | .014 |
| 2.......... | .21 | .54 | .014 | .029 | .0008 | .0039 | 58 | .17 | .015 |
| 3.......... | .29 | .49 | .014 | .028 |  |  | 179 | .31 | .014 |
| 1.......... | .52 | .64 | .014 | .032 |  |  | 160 | .25 | .015 |
| 2.......... | .39 | .52 | .013 | .029 | .0015 | .00685 | 194 | .27 | .015 |
| 3.......... | .21 | .41 | .010 | .024 |  |  | 158 | .19 | .014 |
| 1.......... | .21 | .29 | .018 | .025 | .0024 | .00685 | 174 | .19 | .014 |
| 2.......... | .41 | .49 | .017 | .033 |  |  | 182 | .19 | .014 |
| 3.......... | .29 | .13 | .020 | .036 | .0013 | .0051 | 139 | .29 | .016 |
| 1.......... | .27 | .09 | 022 | .032 |  |  | 141 | .29 | .015 |
|  |  |  |  |  |  |  | 144 | .29 | .016 |
| Average... | .30 | .42 | .0146 | .0290 | .0012 | .0047 | 241 | .29 | .018 |
|  |  |  |  |  |  |  | 155 | .29 | .019 |
|  |  |  |  |  |  |  | 240 | .17 | .016 |
|  |  |  |  |  |  |  | 167 | .17 | .017 |

RUN #2

| | | | | | | | | | |
|---|---|---|---|---|---|---|---|---|---|
| 1.......... | .08 | .15 | .015 | .029 |  |  | 121 | .20 | .014 |
| 2.......... | .12 | .45 | .018 | .030 | .0007 | .0034 | 170 | .25 | .015 |
| 3.......... |  |  |  |  |  |  | 153 | .25 | .015 |
| 1.......... | .12 | .15 | .014 | .028 |  |  | 141 | .15 | .017 |
| 2.......... | .10 | .15 | .017 | .033 |  |  | 162 | .25 | .016 |
| 3.......... | .15 | .10 | .014 | .031 | .0017 | .0040 | 169 | .25 | .012 |
| 1.......... | .10 | .15 | .014 | .028 |  |  | 157 | .23 | .013 |
| 2.......... | .10 | .12 | .012 | .032 |  |  | 179 | .20 | .013 |
| 3.......... | .15 | .10 | .014 | .034 | .0006 | .0024 | 150 | .20 | .012 |
| 1.......... | .08 | .15 | .008 | .028 |  |  | 149 | .20 | .014 |
|  |  |  |  |  |  |  | 182 | .20 | .015 |
| Average... | .11 | .17 | .014 | .030 | .0010 | .0033 | 139 | .15 | .009 |
|  |  |  |  |  |  |  | 155 | .15 | .010 |
|  |  |  |  |  |  |  | 58 | .20 | .008 |
|  |  |  |  |  |  |  | 243 | .25 | .008 |

U. S. P. Limits: CaO=0.6% max.; Fe=0.020% max.
Commercial limit on MgO=0.003% max. (Important to rubber trade.)
The column marked U. S. P. was the analysis of the results of our purification treatment.
The column marked Tech. was the analysis of the results of ordinary commercial runs of the same batches of bicarbonate liquor not subjected to the purification steps.

The loss in bicarbonate solution in the press cake was in the neighborhood of 4.75% and there was an 8% decomposition loss of bicarbonate to normal carbonate. The temperature of the liquor was kept well below temperatures at which normal carbonate is formed rapidly from the bicarbonate, below about 140° F. It is an advantage of the process that the losses referred to are recoverable since the press cake containing the normal carbonate and bicarbonate can be used in ordinary commercial manufacture of insulation material whereby the magnesium content is not wasted.

The increased purity of the finished product thus obtained by commercial processing appears to be of great commercial and scientific interest. This is particularly true of the magnesium oxide prepared from the basic magnesium carbonate. Such a high degree of purity in a commercial run of magnesium oxide is surprising.

Other hydrated magnesium carbonates of which normal magnesium carbonate trihydrate is typical have been found to be effective in this process. The latter compound is not necessarily added to the bicarbonate liquor as such but may be formed by chemical reaction in the bicarbonate liquor. For example, caustic calcined magnesite (chemically active magnesium oxide) or calcined magnesia formed from the basic carbonate by heat decomposition of the latter, or magnesium hydroxide in chemically active form may be added to the bicarbonate solution. When these compounds are added to the liquor, they react with the magnesium bicarbonates to form hydrated magnesium carbonate. Thus broadly the purification step involves the treatment of the magnesium bicarbonate solution with the hydrated magnesium carbonate whether it is added as a slurry or caused to be precipitated in the solution.

We are unable to account for the physical or chemical processes by which the purification as recited is accomplished and we do not offer any theory as to the reaction, if any, that occurs. It would appear however, that the time of exposure of the solution to the slurry, whether in the tanks or in the press, increased the degree of purification. The filtering step as outlined was not significant since test showed that the same absorption of the impurities of the solution in the insoluble magnesium salt took place whether the solution was recovered by filtration, sedimentation or other mechanical or gravity separation.

Having thus described our purification processing, what we claim as new and desire to secure by Letters Patent is:

1. The steps in the process of purifying chemical magnesia from iron and manganese salts during its manufacture which consist, during the stage in which the magnesia is in the form of an aqueous solution of magnesium bicarbonate, $Mg(HCO_3)_2$, containing soluble salts of iron and manganese, in mixing with said solution a substantially water-insoluble hydrated magnesium carbonate, and then separating said solution with the impurities in the magnesium bicarbonate solution greatly reduced.

2. A process for purifying an aqueous solution comprising substantially 3% magnesium bicarbonate, $Mg(HCO_3)_2$, containing soluble iron and manganese impurities which consists in slurrying with said solution a substantially water-insoluble hydrated magnesium carbonate and thereafter separating the purified solution from the slurry.

3. A process for purifying an aqueous solution comprising substantially 3% magnesium bicarbonate, $Mg(HCO_3)_2$, containing soluble iron and manganese impurities which consists in slurrying with said solution a substantially water-insoluble hydrated magnesium carbonate and thereafter separating the purified solution from the slurry, while maintaining the solution at a temperature below that at which normal magnesium carbonate is formed rapidly from the bicarbonate solution.

4. A process for purifying an aqueous solution of magnesium bicarbonate, $Mg(HCO_3)_2$, containing soluble iron and manganese impurities which consists in slurrying with said solution a substantially water-insoluble hydrated magnesium carbonate and thereafter separating the purified solution from the slurry.

5. A process for purifying an aqueous solution of magnesium bicarbonate, $Mg(HCO_3)_2$, containing soluble iron impurities which consists in slurrying with said solution a substantially water-insoluble hydrated magnesium carbonate and thereafter separating the purified solution from the slurry while maintaining the solution at a temperature below about 140° F.

6. A process for purifying an aqueous solution comprising substantially 3% of magnesium bicarbonate, $Mg(HCO_3)_2$, containing soluble iron impurities which consists in slurrying, with said solution, a substantially water-insoluble hydrated magnesium carbonate and separating the solution from the slurry by filtration.

7. A process for purifying an aqueous solution comprising substantially 3% of magnesium bicarbonate, $Mg(HCO_3)_2$, containing soluble iron impurities which consists in slurrying, with said solution, a substantially water-insoluble hydrated magnesium carbonate and separating the solution from the slurry by filtration, the percentage of the insoluble material used as a slurry being determined by analysis for iron impurities in the filtered solution.

8. A process for purifying an aqueous solution comprising substantially 3% of magnesium bicarbonate, $Mg(HCO_3)_2$, containing soluble impurities of the class consisting of iron and manganese salts and mixtures thereof, which consists in slurrying, with said solution, a substantially water-insoluble hydrated magnesium carbonate and separating the solution from the slurry by filtration.

GEORGE M. ARMSTRONG.
H ALBERT COOK.

REFERENCES CITED

The following references are of record in the file of this patent:

UNITED STATES PATENTS

| Number | Name | Date |
| --- | --- | --- |
| 2,390,095 | Gloss | Dec. 4, 1945 |

FOREIGN PATENTS

| Number | Country | Date |
| --- | --- | --- |
| 548,197 | Great Britain | Sept. 30, 1942 |